Aug. 10, 1954   G. S. PHIPPS   2,685,893
WIPED JOINT
Filed June 7, 1950
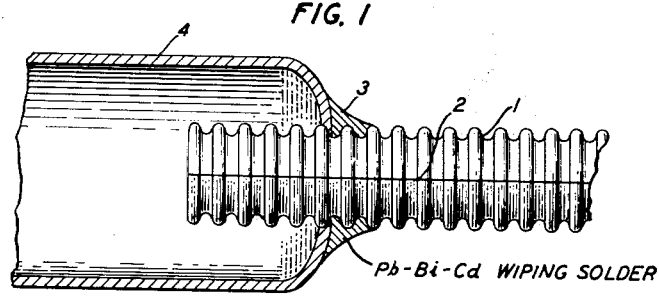
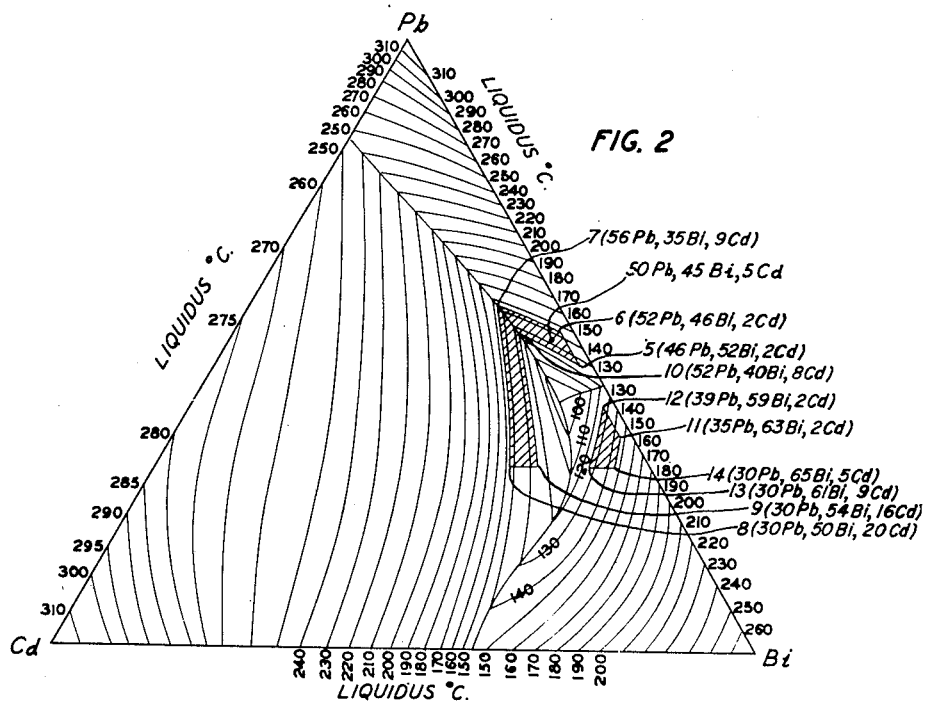
INVENTOR
G. S. PHIPPS
BY
Edwin B. Cave
ATTORNEY Patented Aug. 10, 1954

2,685,893

UNITED STATES PATENT OFFICE 2,685,893

WIPED JOINT

George S. Phipps, Chatham, N. J., assignor to Bell Telephone Laboratories, Incorporated, New York, N. Y., a corporation of New York Application June 7, 1950, Serial No. 166,726

4 Claims. (Cl. 138—25)

This invention relates to wiped cable joints and to cables containing such joints.

Although the wiping solders used in forming the wiped joints of the present invention are of general application, they are particularly useful in situations in which there is a limitation on the temperature to which the device to be wiped may be raised due to physical or chemical instability. One example of this is in the wiping of cable joints over sheathing which already has a solder incorporated in it and the remelting of which latter solder is to be avoided.

In the past, multiconductor cables, particularly those intended for installation out of doors, either suspended in open-air or installed in underground conduit, have generally been made with a seamless, moisture-proof and mechanically protective sheath of lead or suitable lead alloy extruded over the cable core. In the past these sheaths have been generally satisfactory except for weight and bulk, but, in recent years, the cost and scarcity of lead have been an incentive for the development of a lead sheath substitute.

Consequently, cables having thin sheaths of metals, such as copper, brass or aluminum, in the form of a transversely corrugated tape applied longitudinally about the core with overlapping edges to form a longitudinal seam have been developed. These cables have proved to be satisfactory in that they are mechanically strong and moisture-proof, and in that the materials for the sheaths are less expensive.

However, the development of these substitute cable sheaths has introduced a problem not formerly encountered, that is, the problem of wiping the joints. Where these sheathed cables having longitudinal soldered seams are joined, it was found that use of the conventional wiping solders, that is, solders of lead-tin composition, due to their high melting range, resulted in an opening of the sheath seam. This results since the lead-tin solders used for sealing seams has a solidus point which is lower than the application temperature of the common wiping solders. This difficulty is even more serious where a filler or flooding compound which is rendered fluid upon heating is used immediately beneath the sheathing as, for example, in the cable described in the copending application of E. E. Schumacher, Serial No. 127,821, filed November 17, 1949. This application teaches the use of a cable with an aluminum layer and successive layers of asphaltic filler, polyethylene and asphaltic filler beneath a lead alloy coated brass sheathing which sheathing is sealed longitudinally by a lead-tin solder. Where such a filler is present, a melting of the sheath seam during the wiping of the joint results in escape of part of this filler through the opening, which in turn makes resealing of the sheath extremely difficult. An additional difficulty in the case of the cable above referred to, is that use of conventional high melting type solders results in injury to the polyethylene jacket.

Research has indicated that the usual tin-lead alloy solders are satisfactory for sealing the seam in the sheath. To insure permanence of the seam during the wiping operation, the wiping solder employed should, under no circumstances, require heating to a temperature as high as the solidus temperature of the seam alloy, and, preferably, should not approach a value closer than 30° C. or 40° C. to that of the solidus temperature of the seam solder. These tin-lead solders have a solidus temperature of about 185° C. thereby limiting the liquidus point of the seam solder to a maximum of 145° C. or 155° C.

According to the present invention a wiping solder having a solidus point of about 91° C. and a liquidus point of no more than 145° C. is provided and is, therefore, well adapted to the wiping of a joint on a cable having a seamed sheath sealed by the common solders. Furthermore, this wiping solder has desirable handling properties and, after some slight experience, may be handled at least as easily as any of the conventional solders on the market.

The wiping solder of the present invention is made up of cadmium, bismuth and lead, and may contain small amounts of arsenic, antimony, copper, iron, zinc, tin and other incidental impurities.

The invention will be more clearly understood from the following detailed description when read in conjunction with the following drawings, in which:

Fig. 1 is an elevation in section of a joint in a cable embodying this invention; and Fig. 2 is a ternary diagram of the cadmium, bismuth, lead system on which the composition ranges of the present invention are drawn in.

As shown in Fig. 1, the embodiment of the invention illustrated comprises a cable with a metal sheathing 1 which sheathing has a longitudinal soldered seam 2, and in which joint 4 and sheathing 1 are wiped by wiping solder 3 of this invention. A more detailed description of one species of such cable will be found in the copending application of E. E. Schumacher above cited.

Fig. 2 is a ternary diagram of the cadmium, bismuth, lead system in which the three corners represent 100 weight per cent of the noted elements cadmium, bismuth and lead and in which all intermediate compositions are to be plotted linearly. The liquidus points of the alloys of the system are plotted as isotherms. The temperatures of these isotherms are labeled as degrees centigrade along the edges of the diagram. The alloy compositions of this invention are those in the shaded areas on the diagram.

According to Fig. 2, it is seen that the composition range of this invention is bounded by the 125° C. and 145° C. isotherms and is further limited so that the amount of cadmium shall not fall below 2 per cent, nor that of lead below 30 per cent. Although, for reasons of economics, it has been preferable to use compositions in the area above the ternary eutectic, that is, the area bounded by points 5, 6, 7 and 10, it has been found that solders of various other compositions within all portions of the marked areas are just as satisfactory from a working standpoint. It should be noted that the areas marked on the diagram may be very closely approximated by the straight-line area formed by joining the numbered points 5 through 14 by straight lines. This is especially true with area 5, 6, 7, 10 in which the 125 and 145° C. isotherms are almost exactly straight. Consequently, these areas bounded by straight lines may also be taken as defining the range of compositions suitable for the purposes of the present invention.

Approximate compositions in weight per cent of the noted points 5 through 14 on the ternary diagram are below noted.

| Points | Cadmium | Bismuth | Lead |
| --- | --- | --- | --- |
| 5 | 2 | 52 | 46 |
| 6 | 2 | 46 | 52 |
| 7 | 9 | 35 | 56 |
| 8 | 20 | 50 | 30 |
| 9 | 16 | 54 | 30 |
| 10 | 8 | 40 | 52 |
| 11 | 2 | 63 | 35 |
| 12 | 2 | 59 | 39 |
| 13 | 9 | 61 | 30 |
| 14 | 5 | 65 | 30 |

The marked ranges on the ternary diagram are significant. The solder should not have a liquidus point above 145° C. because that is the high temperature limit if a joint is to be wiped without reopening a sheathing seam soldered by a conventional lead-tin solder. The solder should not have a liquidus point below 125° C., this limitation being necessary to preserve the working qualities of the solder, since, if the ternary eutectic is more closely approached, more of the solder will crystallize at the eutectic composition and there will not be a sufficient working spread between liquidus and solidus. The 30-per cent lead composition limitation, again, is to preserve the working characteristics, since, if lower lead compositions are utilized, the working range becomes too broad, more of the mixture will come out as a liquid, and a porous joint is more likely to result. It is necessary to have a 2-per cent minimum of cadmium present to maintain the low ternary solidus point, that is, to keep the solder from showing the binary characteristics of the bismuth-lead system rather than those of the ternary system.

Experiment has disclosed that the common impurities generally present in lead do not hinder, but rather, aid the working characteristics of the solder if certain limitations are observed. An exception to this is that the presence of arsenic must be kept down to a maximum of .01 per cent where the sheathing to be wiped is made of brass, or where it contains zinc, since, in such a case it is believed that a zinc-arsenic interphasial constituent is formed which, during wiping, becomes oxidized and which effectively prevents wetting of the sheathing. Where the sheathing to be wiped is not brass and does not contain zinc the presence of arsenic in small amounts produces a finer grain solder and therefore makes it more workable. Where brass or zinc containing sheaths are not to be wiped, or where the sheath is coated with a metal not containing zinc, the arsenic may be present in amounts up to .15 per cent and preferably should be present in amounts of about .1 per cent. It was found that the use of relatively high percentages of antimony increased the strength of the solder and its freedom from porosity. However, it was found desirable to limit the antimony content to about 1 per cent, the preferable content being about .5 per cent. The preferable upper limit for copper is about .1 per cent, that for iron about .02 per cent, and for zinc about .002 per cent.

It was also found that additions of small amounts of tin have little effect on the working qualities of the solder. Thus, an addition of up to 1 per cent tin was found to have no other discernible effect than to lower the solidus point from the lead-bismuth-cadmium ternary eutectic to about 83° C.

Laboratory tests have shown the solder to be readily wipable and, after some experience, simpler to handle than the conventional wiping solders. Joints wiped with the new alloy were pressure tested and found gas-tight. Experiment has shown that solidification of the new solder is slow compared to that of lead-tin solders. This is presumably due to the lesser heat flow at the low operating temperature and to the poor thermal conductivity of the bismuth in the alloy. This slow solidification rate is especially beneficial and to a large extent compensates for the comparatively short solidification temperature range of the alloy. The tensile strength and elongation of the new solders have been tested, and the properties can be considered comparable to those of other wiping solders in use.

The ultimate tensile strength and elongation of a 50-per cent lead, 45-per cent bismuth, 5-per cent cadmium solder, as determined by one-quarter inch diameter castings similar to ASTM die casting alloy test specimens, aged for 100 hours is 6000 pounds per square inch with an 18-per cent elongation.

After a joint has been wiped using the new solder, and the excess alloy from the catch pan returned to the solder pot and melted, a considerable amount of dross will be found floating on the surface of the melt. Analysis of this material plus entrapped solder makes it apparent that the cadmium, presumably as cadmium oxide, is the major cause of the dross. Fortunately, these drosses can readily be reduced to metals in the solder pot by stearine at temperatures usually reached just prior to wiping. It is undesirable to allow the temperature of the alloy to go above 350° C. since at these temperatures a black velvety oxide forms on the surface of the solder, which oxide is very difficult to reduce, If the temperature of the solder pot never exceeds 180° C. as required to avoid fusion of the usual solders used for sealing sheathing seams, the difficultly reduced oxide will not occur. Since the pot temperature is low, stearine can be retained on the surface, thereby eliminating oxide formation in the solder pot. Analysis for cadmium oxide vaporization from continually ladled solder indicates that the cadmium oxide vapor concentration is well below the toxic limit.

The invention has been described above in terms of the use of the wiping solder of the present invention for wiping joints in electrical cable having a sheathing containing a soldered seam. The invention is obviously applicable to the wiping of joints in any other metal sheathed cable or, more broadly, joints between any tubular metal members. The invention has been described in terms of its specific embodiments and since certain modifications and equivalents will be apparent to those skilled in the art, the description above is intended to be illustrative of, and not necessarily to constitute a limitation upon, the scope of the invention.

What is claimed is:

1. A cable sheath joint wiped with a wiping solder consisting of lead, bismuth and cadmium in the range of proportions between the 125° C. and 145° C. isotherms and bounded by the 2-per cent cadmium and 30-per cent lead composition alloys on the lead, bismuth, cadmium ternary diagram of Fig. 2 of the drawing, together with incidental impurities.

2. A metal sheathed cable having a soldered seam in its sheath and a joint wiped with a wiping solder consisting of lead, bismuth and cadmium in the range of proportions bounded by straight lines joining successively the composition points cadmium 2 per cent, bismuth 52 per cent; cadmium 2 per cent, bismuth 46 per cent; cadmium 9 per cent, bismuth 35 per cent; cadmium 8 per cent, bismuth 40 per cent on the lead, bismuth, cadmium ternary diagram of Fig. 2 of the drawing; the remainder lead, together with incidental impurities.

3. A brass sheathed cable the sheath of which has a longitudinal seam sealed by a lead-tin solder and a joint wiped with a wiping solder containing 5 per cent cadmium, 45 per cent bismuth, and the remainder lead, together with incidental impurities.

4. A joint between two tubular metal members wiped with a wiping solder consisting of lead, bismuth and cadmium in the range of proportions between the 125° C. and 145° C. isotherms and bounded by the 2-per cent cadmium and 30-per cent lead composition alloys on the lead, bismuth, cadmium ternary diagram of Fig. 2 of the drawing, together with incidental impurities.

References Cited in the file of this patent

UNITED STATES PATENTS

| Number | Name | Date |
| --- | --- | --- |
| 2,156,772 | Seely | May 2, 1939 |
| 2,321,071 | Ehrhardt | June 8, 1943 |
| 2,446,543 | Mample | Aug. 10, 1948 |
| 2,508,488 | Bouton | May 23, 1950 |
| 2,571,857 | Garrison | Oct. 16, 1951 |

OTHER REFERENCES

Barlow: Treatise in the Journal Amer. Chem. Soc., 1910, vol. 32, pages 1390–1412 (pages 1402–1404, 1408, 1410 relied upon).

Vickers: "Metals and Their Alloys," 1923, page 580; published by Henry Carey Baird & Co., New York.

Di Capua: Treatice in Gazz. Chim. Ital., 1925, vol. 55, pages 582–594 (particularly pages 583, 586, 587, 591–593).